(12) United States Patent
Disher et al.

(10) Patent No.: US 6,202,453 B1
(45) Date of Patent: Mar. 20, 2001

(54) TRAILER GUARD

(76) Inventors: William R. Disher; Gail M. Disher; John E. Bechard, all of 108 Mill Street West, Kingsville, Ontario (CA), N9Y 1W5

( * ) Notice: Subject to any disclaimer, the term of this patent is extended or adjusted under 35 U.S.C. 154(b) by 0 days.

(21) Appl. No.: 09/490,984

(22) Filed: Jan. 26, 2000

(51) Int. Cl.[7] .................................................. E05B 73/00
(52) U.S. Cl. .................................. 70/14; 70/232; 70/258; 280/507
(58) Field of Search ........................... 70/14, 57, 58, 70/163, 164, 167, 168, 233, 258, 237; 280/507

(56) References Cited

U.S. PATENT DOCUMENTS

| | | | |
|---|---|---|---|
| 2,671,675 | * 3/1954 | Swisgood | 280/507 |
| 3,226,133 | * 12/1965 | Geresy | 280/507 |
| 3,605,457 | * 9/1971 | Foster | 70/258 X |
| 3,820,823 | * 6/1974 | Beaston | 70/258 X |
| 4,082,311 | * 4/1978 | Hamman | 280/507 |
| 4,285,221 | * 8/1981 | Atchisson | 70/416 |
| 4,428,596 | * 1/1984 | Bell et al. | 280/507 |
| 4,577,884 | * 3/1986 | Harris | 280/507 |
| 4,774,823 | 10/1988 | Callison | 70/14 |
| 4,776,607 | * 10/1988 | Richter et al. | 280/507 |
| 4,836,570 | * 6/1989 | Lopez et al. | 280/507 |
| 5,018,759 | * 5/1991 | Villalon, Jr. | 280/507 |
| 5,052,203 | * 10/1991 | Van Cuyk | 70/232 |
| 5,147,096 | * 9/1992 | Rogers | 280/507 |
| 5,176,014 | * 1/1993 | Erickson | 70/232 |
| 5,195,339 | 3/1993 | Nee et al. | 70/14 |
| 5,219,435 | * 6/1993 | Sprunger | 280/507 X |
| 5,222,755 | 6/1993 | O'Neal | 280/507 |
| 5,332,251 | 7/1994 | Farquhar | 280/507 |
| 5,421,601 | * 6/1995 | Hinze et al. | 70/258 X |
| 5,441,295 | * 8/1995 | Smith | 280/507 |
| 5,775,139 | 7/1998 | Sellers | 70/14 |
| 5,794,961 | 8/1998 | Niswanger | 280/507 |
| 5,937,679 | * 8/1999 | Villalon, Jr. | 70/58 |

* cited by examiner

*Primary Examiner*—Suzanne Dino Barrett
(74) *Attorney, Agent, or Firm*—Joseph N. Breaux

(57) ABSTRACT

An anti-theft, anti-damage and/or anti-vandalism device for trailers that includes a trailer guard for preventing access to the trailer ball attachment portion of a trailer and, thereby, preventing damage to the trailer ball attachment portion as well as theft of the entire trailer. The trailer guard includes a ball attachment portion shield assembly, a shield assembly locking plate, and a lock assembly.

2 Claims, 1 Drawing Sheet

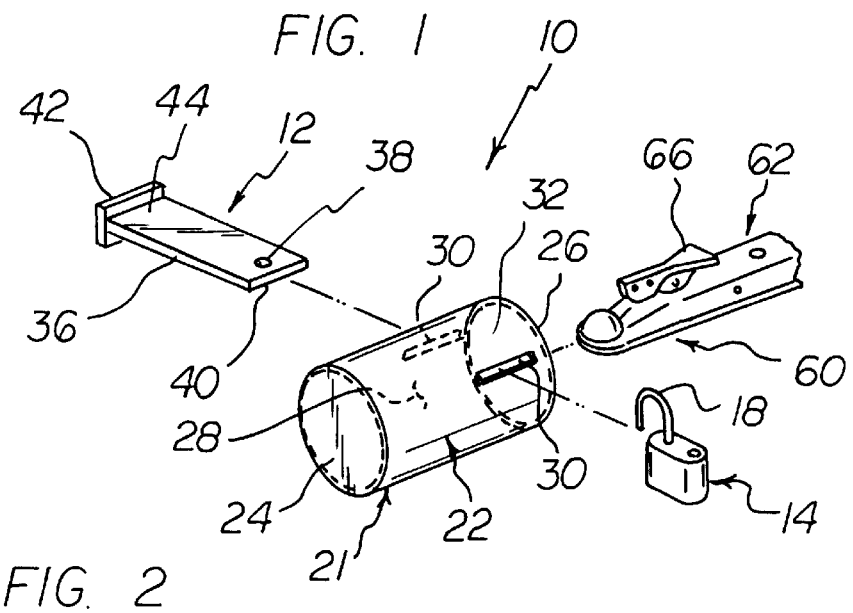

TRAILER GUARD

TECHNICAL FIELD

The present invention relates to anti-theft and anti-vandalism devices and more particularly to a trailer guard for preventing access to the trailer ball attachment portion of a trailer and thereby preventing damage to the trailer ball attachment portion as well as theft of the entire trailer; the trailer guard including a ball attachment portion shield assembly, a shield assembly locking plate, and a lock assembly; the ball attachment portion shield assembly being constructed from rigid steel and including a cylinder shaped shield with one closed end, one open ball attachment portion insertion end, a cylinder shaped ball attachment portion receiving cavity defined within the cylinder shaped shield between the closed end and the open ball attachment portion insertion end, and two opposed elongated locking plate passage slots formed through the sidewall of the cylinder shaped shield; the shield assembly locking plate including a rectangular locking plate element having a locking bolt passage aperture formed therethrough adjacent to an insertion end thereof and a blocking plate perpendicularly attached to a locking plate element end thereof opposite the insertion end, the bolt passage aperture being spaced sufficiently from the blocking plate such that the bolt passage aperture is positioned exteriorly of the cylinder shaped shield when the insertion end has been positioned through both of the opposed elongated locking plate passage slots; the lock assembly including a locking bolt lockable through the bolt passage aperture.

BACKGROUND ART

Many trailers are stolen each year by a thief who simply hooks the trailer to a vehicle and drives away. It would be a benefit, therefore, to trailer owners to have a trailer guard for covering and preventing access to the trailer ball attachment portion of the trailer to prevent a thief from driving away with the trailer. In addition, it would be a further benefit to have a trailer guard that also provided a shield for shielding the trailer ball attachment portion of the trailer from weather damage, accidental damage and/or just plain vandalism.

GENERAL SUMMARY DISCUSSION OF INVENTION

It is thus an object of the invention to provide a trailer guard that includes a ball attachment portion shield assembly, a shield assembly locking plate, and a lock assembly; the ball attachment portion shield assembly being constructed from rigid steel and including a cylinder shaped shield with one closed end, one open ball attachment portion insertion end, a cylinder shaped ball attachment portion receiving cavity defined within the cylinder shaped shield between the closed end and the open ball attachment portion insertion end, and two opposed elongated locking plate passage slots formed through the sidewall of the cylinder shaped shield; the shield assembly locking plate including a rectangular locking plate element having a locking bolt passage aperture formed therethrough adjacent to an insertion end thereof and a blocking plate perpendicularly attached to a locking plate element end thereof opposite the insertion end, the bolt passage aperture being spaced sufficiently from the blocking plate such that the bolt passage aperture is positioned exteriorly of the cylinder shaped shield when the insertion end has been positioned through both of the opposed elongated locking plate passage slots; the lock assembly including a locking bolt lockable through the bolt passage aperture.

Accordingly, a trailer guard is provided. The trailer guard includes a ball attachment portion shield assembly, a shield assembly locking plate, and a lock assembly; the ball attachment portion shield assembly being constructed from rigid steel and including a cylinder shaped shield with one closed end, one open ball attachment portion insertion end, a cylinder shaped ball attachment portion receiving cavity defined within the cylinder shaped shield between the closed end and the open ball attachment portion insertion end, and two opposed elongated locking plate passage slots formed through the sidewall of the cylinder shaped shield; the shield assembly locking plate including a rectangular locking plate element having a locking bolt passage aperture formed therethrough adjacent to an insertion end thereof and a blocking plate perpendicularly attached to a locking plate element end thereof opposite the insertion end, the bolt passage aperture being spaced sufficiently from the blocking plate such that the bolt passage aperture is positioned exteriorly of the cylinder shaped shield when the insertion end has been positioned through both of the opposed elongated locking plate passage slots; the lock assembly including a locking bolt lockable through the bolt passage aperture.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is an exploded perspective view of the hitch ball attachment portion of a representative trailer and an exemplary embodiment of the trailer guard of the present invention showing the ball attachment portion shield assembly, the shield assembly locking plate, and the lock assembly; the ball attachment portion shield assembly being constructed from rigid steel and including a cylinder shaped shield with one closed end, one open ball attachment portion insertion end, a cylinder shaped ball attachment portion receiving cavity defined within the cylinder shaped shield between the closed end and the open ball attachment portion insertion end, and two opposed elongated locking plate passage slots formed through the sidewall of the cylinder shaped shield; the shield assembly locking plate including a rectangular locking plate element having a locking bolt passage aperture formed therethrough adjacent to an insertion end thereof and a blocking plate perpendicularly attached to a locking plate element end thereof opposite the insertion end, the bolt passage aperture being spaced sufficiently from the blocking plate such that the bolt passage aperture is positioned exteriorly of the cylinder shaped shield when the insertion end has been positioned through both of the opposed elongated locking plate passage slots; the lock assembly including a locking bolt lockable through the bolt passage aperture.

FIG. 2 is a perspective view showing the trailer guard of FIG. 1 installed on a representative trailer.

FIG. 3 is a perspective view of a second exemplary embodiment of the ball attachment portion shield assembly that is identical to the ball attachment portion shield assembly of FIG. 1 except that open ball attachment portion insertion end is further defined by a curved cut-out from an adjacent bottom portion of the cylinder shaped shield to allow the ball attachment portion shield assembly to fit over the ball attachment portion of a variety of trailers.

EXEMPLARY MODE FOR CARRYING OUT THE INVENTION

FIG. 1 shows an exemplary embodiment of the trailer guard of the present invention generally designated 10.

Trailer guard 10 includes a ball attachment portion shield assembly, generally designated 11; a shield assembly locking plate, generally designated 12; and a lock assembly, generally designated 14. In this embodiment, lock assembly 14 is a conventional key operating padlock having a case hardened locking bolt 18. Although a key operating lock is used in this embodiment, it should be understood that combination type locks are equally effective in practicing the invention.

Ball attachment portion shield assembly 11 is constructed from rigid steel and includes a cylinder shaped shield, generally designated 22, with one closed end 24, one open ball attachment portion insertion end 26 (shown in dashed lines), a cylinder shaped ball attachment portion receiving cavity 28 (shown in dashed lines) defined within cylinder shaped shield 22 between closed end 24 and open ball attachment portion insertion end 26, and two opposed elongated locking plate passage slots 30 formed through the sidewall 32 of cylinder shaped shield 22.

Shield assembly locking plate 12 is constructed from rigid steel and includes a rectangular locking plate element 36 having a locking bolt passage aperture 38 formed therethrough adjacent to an insertion end 40 thereof and a rectangular blocking plate 42 perpendicularly attached to a locking plate element end 44 thereof opposite the insertion end 40. Referring also to FIG. 2, bolt passage aperture 38 is spaced sufficiently from blocking plate 42 such that bolt passage aperture 38 is positioned exteriorly of cylinder shaped shield 22 when the insertion end 40 has been positioned through both of the opposed elongated locking plate passage slots 30 to allow the user to lock the locking plate 12 to cylinder shaped shield 22. In use, the user inserts the ball attachment portion, generally designated 60 of the trailer 62 to be protected into the cylinder shaped ball attachment portion receiving cavity 28 (shown in dashed lines) defined within cylinder shaped shield 22 such that the ball grasping hasp 66 is positioned inside past the two opposed elongated locking plate passage slots 30. Rectangular locking plate element 36 is then inserted through the two opposed elongated locking plate passage slots 30 and locked as previously described. Contact between rectangular locking plate element 36 and ball grasping hasp 66 prevents a thief from removing cylinder shaped shield 22.

FIG. 3 shows a second exemplary embodiment of the ball attachment portion shield assembly, generally designated 11a. Ball attachment portion shield assembly 11a is identical to ball attachment portion shield assembly 11 except that open ball attachment portion insertion end 26a is further defined by a curved cut-out 70 from an adjacent bottom portion of shield 22a to allow ball attachment portion shield assembly 11a to fit over the ball attachment portion 60 of a variety of trailers 62.

It can be seen from the preceding description that a trailer guard has been provided.

It is noted that the embodiment of the trailer guard described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer guard comprising:

a ball attachment portion shield assembly;

a shield assembly locking plate; and a lock assembly;

said ball attachment portion shield assembly being constructed from rigid steel and including a cylinder shaped shield with one closed end, one open ball attachment portion insertion end, a cylinder shaped ball attachment portion receiving cavity defined within said cylinder shaped shield between said closed end and said open ball attachment portion insertion end, and two opposed elongated locking plate passage slots formed through a sidewall of said cylinder shaped shield;

said shield assembly locking plate including a rectangular locking plate element having a locking bolt passage aperture formed therethrough adjacent to an insertion end thereof and a blocking plate perpendicularly attached to a locking plate element end thereof opposite said insertion end, said bolt passage aperture being spaced sufficiently from said blocking plate such that said bolt passage aperture is positioned exteriorly of said cylinder shaped shield when said insertion end has been positioned through both of said opposed elongated locking plate passage slots;

said lock assembly including a locking bolt lockable through said bolt passage aperture.

2. A trailer guard comprising:

a ball attachment portion shield assembly;

a shield assembly locking plate; and a lock assembly;

said ball attachment portion shield assembly being constructed from rigid steel and including a shield with one closed end, one open ball attachment portion insertion end, a ball attachment portion receiving cavity defined within said shield between said closed end and said open ball attachment portion insertion end, and two opposed elongated locking plate passage slots formed through a sidewall of said shield, said open ball attachment portion insertion end being partially defined by a curved cut-out from an adjacent bottom portion of the shield;

said shield assembly locking plate including a rectangular locking plate element having a locking bolt passage aperture formed therethrough adjacent to an insertion end thereof and a blocking plate perpendicularly attached to a locking plate element end thereof opposite said insertion end, said bolt passage aperture being spaced sufficiently from said blocking plate such that said bolt passage aperture is positioned exteriorly of said shield when said insertion end has been positioned through both of said opposed elongated locking plate passage slots;

said lock assembly including a locking bolt lockable through said bolt passage aperture.

\* \* \* \* \*